(12) United States Patent
Ding et al.

(10) Patent No.: US 12,352,866 B2
(45) Date of Patent: Jul. 8, 2025

(54) ELECTRONIC DEVICE AND METHOD

(71) Applicant: Sony Semiconductor Solutions Corporation, Kanagawa (JP)

(72) Inventors: Qing Ding, Stuttgart (DE); Victor Belokonskiy, Zaventem (BE); Ward Van Der Tempel, Muizen (BE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1156 days.

(21) Appl. No.: 17/258,709

(22) PCT Filed: Jul. 10, 2019

(86) PCT No.: PCT/EP2019/068546
§ 371 (c)(1),
(2) Date: Jan. 7, 2021

(87) PCT Pub. No.: WO2020/016075
PCT Pub. Date: Jan. 23, 2020

(65) Prior Publication Data
US 2021/0318443 A1    Oct. 14, 2021

(30) Foreign Application Priority Data

Jul. 17, 2018    (EP) .................................... 18184041

(51) Int. Cl.
*G01C 3/08*    (2006.01)
*G01S 17/36*    (2006.01)
*G01S 17/894*    (2020.01)

(52) U.S. Cl.
CPC ............ *G01S 17/894* (2020.01); *G01S 17/36* (2013.01)

(58) Field of Classification Search
CPC ............................. G01S 17/894; G01S 17/36
See application file for complete search history.

(56) References Cited

U.S. PATENT DOCUMENTS

| 4,317,209 A | 2/1982 | Barthelme |
| 5,745,437 A | 4/1998 | Wachter |
| 6,031,601 A * | 2/2000 | McCusker .............. G01S 17/48 356/5.1 |
| 9,217,635 B2 | 12/2015 | Guetta |
| 9,405,008 B2 | 8/2016 | Raskar |
| 9,726,762 B2 | 8/2017 | Wilks |
| 10,416,292 B2 * | 9/2019 | de Mersseman ....... G01S 17/32 |

(Continued)

FOREIGN PATENT DOCUMENTS

| CN | 103765241 A | 4/2014 |
| DE | 102013205600 A1 | 10/2013 |

(Continued)

OTHER PUBLICATIONS

International Search Report and Written Opinion mailed Oct. 25, 2019 in connection with International Application No. PCT/EP2019/068546.

(Continued)

*Primary Examiner* — Mark Hellner
(74) *Attorney, Agent, or Firm* — Wolf, Greenfield & Sacks, P.C.

(57) ABSTRACT

An electronic device comprising circuitry configured to generate a coded modulation signal (54; 60) for modulating illumination light (16; 55) transmitted by a time of flight camera (3).

14 Claims, 13 Drawing Sheets

(56) References Cited

U.S. PATENT DOCUMENTS

| | | | |
|---|---|---|---|
| 2002/0060784 A1* | 5/2002 | Pack .................. | G01S 17/89 |
| | | | 356/6 |
| 2009/0059201 A1* | 3/2009 | Willner ................ | G01S 17/58 |
| | | | 356/5.01 |
| 2013/0021595 A1 | 1/2013 | Guetta | |
| 2013/0329234 A1* | 12/2013 | Murakami ........... | G01S 7/4915 |
| | | | 356/625 |
| 2016/0178749 A1* | 6/2016 | Lin ...................... | G01S 17/08 |
| | | | 348/302 |
| 2017/0180698 A1 | 6/2017 | Kim | |
| 2017/0329010 A1 | 11/2017 | Warke | |
| 2017/0343652 A1 | 11/2017 | De Mersseman | |
| 2019/0033448 A1* | 1/2019 | Molnar ................ | G01S 7/4816 |

FOREIGN PATENT DOCUMENTS

| | | | |
|---|---|---|---|
| EP | 2680035 A1 | 1/2014 | |
| KR | 20170134502 A | 12/2017 | |
| WO | WO 01/55746 A1 | 8/2001 | |
| WO | WO 2017138033 A1 * | 8/2017 | ............. G01S 17/36 |
| WO | PCT/EP2019/068546 | 10/2019 | |

OTHER PUBLICATIONS

Bamji et al., A 0.13 μm CMOS system-on-chip for a 512x 424 time-of-flight image sensor with multi-frequency photo-demodulation up to 130 MHz and 2 GS/s ADC. IEEE Journal of Solid-State Circuits. Jan. 2015;50(1):303-19.

International Preliminary Report on Patentability mailed Jan. 28, 2021 in connection with International Application No. PCT/EP2019/068546.

Communication pursuant to Article 94(3) EPC dated Nov. 9, 2023 in connection with European Application No. 19736737.8.

* cited by examiner

ELECTRONIC DEVICE AND METHOD

CROSS-REFERENCE TO RELATED APPLICATIONS

This application claims the benefit under 35 U.S.C. § 371 as a U.S. National Stage Entry of International Application No. PCT/EP2019/068546, filed in the European Patent Office as a Receiving Office on Jul. 10, 2019, which claims priority to European Patent Application Number 18184041.4, filed in the European Patent Office on Jul. 17, 2018, each of which is hereby incorporated by reference in its entirety.

TECHNICAL FIELD

The present disclosure generally pertains to the field of electronic devices, in particular imaging devices and methods for imaging devices.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

An indirect ToF camera (iTOF) measures the phase-delay of e.g. reflected infrared (IR) light. Phase data is obtained by correlating the reflected signal with a reference signal (the illumination signal). A typical number of four frames is used to calculate the depth image. In a so-called "2-tap/4 frame" system, the modulator is a 2-tap electro-optical modulator. The key advantage of the "2-tap/4 frame" system is that all photo-generated electrons are exploited, instead of dumping one-half of the electrons, such as within the 1-tap pixel in which the dumped electrons represent the opposite sampling signal.

Although there exist demodulation techniques for time-of-flight cameras, it is generally desirable to provide better demodulation techniques for a time-of-flight camera.

SUMMARY

According to a first aspect, the disclosure provides an electronic device comprising circuitry configured to generate a coded modulation signal for modulating illumination light transmitted by a time of flight camera.

According to a second aspect, the disclosure provides a system comprising circuitry configured to generate a coded modulation signal for modulating illumination light transmitted by a time of flight camera and/or for demodulating reflected light received by a time of flight camera, an image sensor configured to receive the reflected light, and an illumination light source configured to transmit the modulated illumination light.

According to a third aspect, the disclosure provides a method comprising generating a coded modulation signal for modulating illumination light transmitted by a time of flight camera.

According to a fourth aspect, the disclosure provides a computer program comprising instructions, the instructions when executed on a processor, generating a control signal for generating a coded modulation signal for modulating illumination light transmitted by a time of flight camera.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 3:
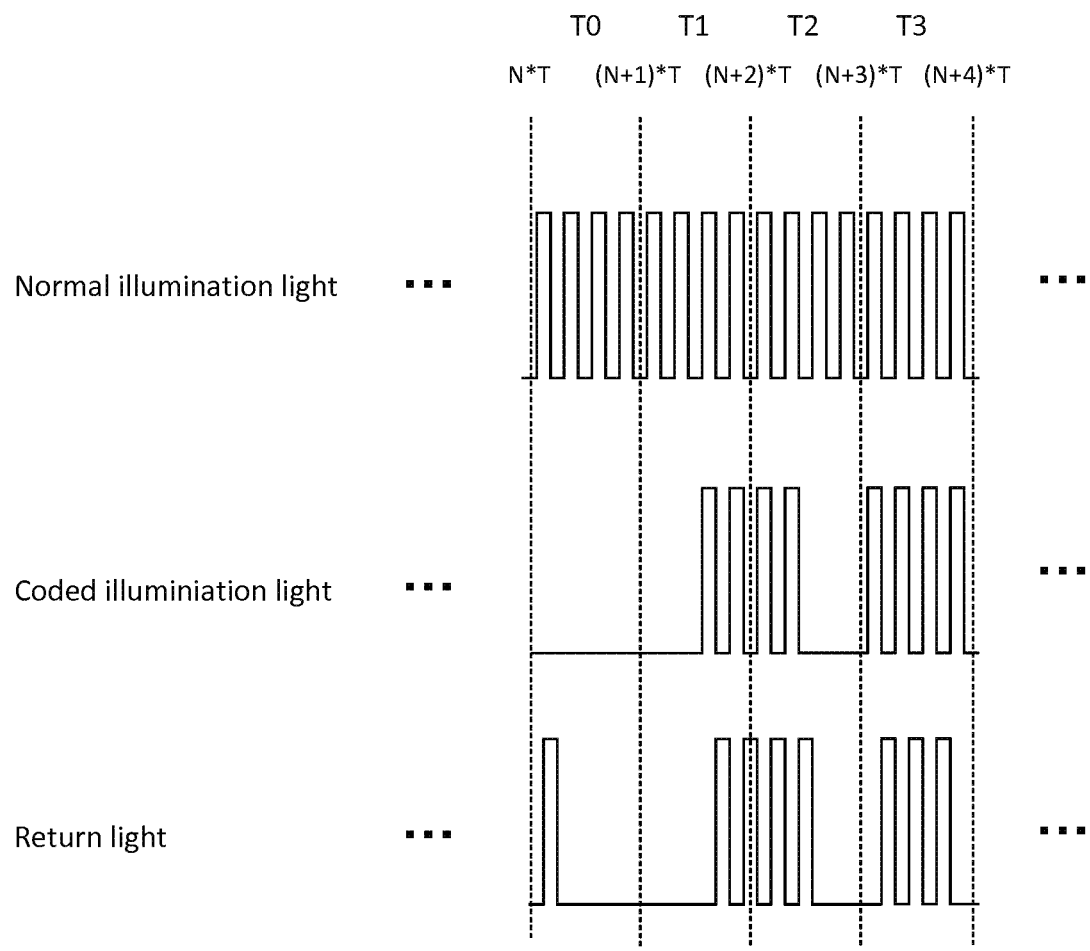
FIG. 3 shows an embodiment of a coded illumination light and its return light which aims at dealing with the ambiguity problem in ToF sensor.

Before a detailed description of the embodiments under reference of FIG. 3, general explanations are made.

The embodiments described below provide an electronic device comprising circuitry configured to generate a coded modulation signal for modulating illumination light transmitted by a time of flight camera.

The electronic device may for example be an image sensor, e.g. an image sensor of an indirect time of flight camera (ToF).

Circuitry may include any electronic elements, semiconductor elements, switches, amplifiers, transistors, processing elements, and the like.

A time of flight camera may be a range imaging camera system that determines the distance of objects measuring the time of flight (ToF) of a light signal between the camera and the object for each point of the image. An indirect time of flight camera (iToF) works by measuring a phase delay. The phase delay may be the result of a correlation of the coded modulation signal with a modulation signal. Phase data may be used to obtain the phase delay. Phase data may for example comprise four correlation phases, e.g. $QA_0$ and $QB_{180}$, phase $QA_{90}$ and $QB_{270}$, phase $QA_{270}$ and $QB_{90}$, and phase $QA_{180}$ and $QB_0$. Each phase data may be stored in a phase memory of the ToF camera. A phase memory may be shared and reused by multiple taps. For example, the electronic device may comprise two taps, each tap receiving a respective phase data during a sub-exposure. Alternatively the electronic device may comprise N taps, where N stands for the number of phases ("or correlations") that can be stored in the pixel.

In some embodiments, the coded modulation signal is generated by on/off keying of a modulation clock.

The coded modulation signal may be based on a modulation clock, wherein the modulation clock may generate a periodic signal, more preferably a square wave. The modulation clock may be continuous wave with a constant frequency. In particular, the coded modulation signal may be generated by "turning on and off" the normal modulation signal produced by a modulation clock. The coded modulation signal may be based on the modulation signal, where the modulation signal may be turned on for a predetermined time interval and turned off for a predetermined time interval.

Instead of using multiple PLLs to generate illumination light with different frequencies as in the conventional method, by generating the coded modulation signal by on/off keying of a modulation clock, the coded modulation signal may be generated by one single phase locked loop (PPL) only. Therefore the power consumption of a ToF camera may be reduced.

As compared to conventional dual frequency method where two distinct measurements with two different modulation signals having different modulation frequencies are used, the electronic device of the embodiments may make the dis-ambiguity/de-aliasing/phase-unwrapping done in a single snapshot instead of two (or more) snapshots. This may improve the frame rate, may lower down the power consumption and may avoid possible frequency contamination problem.

In some embodiments, the coded modulation signal comprises at least two modulation frequencies.

In some embodiments, the coded modulation signal comprises a high frequency and a low frequency.

The high modulation frequency may be a "normal" modulation frequency produced by a modulation clock which is typically used in a sensor of a time of flight camera. The coded modulation signal may for example comprise a high frequency, which corresponds to the first-modulated frequency (modulation clock), and a low frequency, which corresponds to the second modulation frequency and exists in the envelope as some specific modulation codes.

In some embodiments, the high frequency of the coded modulation signal is generated by a modulation clock and the low frequency of the modulation signal corresponds to a frequency of the envelope of the coded modulation signal.

Since in addition to the higher frequency predefined by the modulation clock, there are other frequency components in the envelope, a distance measurement may be done without distance ambiguity. Further, the system complexity of a ToF camera may be less and only one frame may be required for a ToF camera with N-phase pixel.

In some embodiments, the circuitry is configured to generate double-modulated illumination light based on the coded modulation signal.

For example, a first and a second frequency may be created by modulating the modulated light twice to generate double-modulated illumination light. Instead of a continuous normal illumination light as shown, illumination light coded by on-off keying may be transmitted.

In some embodiments, a coded illumination light is generated by modulating the illumination light twice.

In some embodiments, a first frequency component of the coded modulation signal is used to calculate a coarse phase shift and a second frequency component of the coded modulation signal is used to calculate a fine phase shift.

Compared to the second frequency, the first frequency may have an extended range of operation without ambiguity in the measured distance (at the cost of a higher distance uncertainty). The extended range of operation represents the maximum distance that is possible to measure, and the distance uncertainty represents the probability distribution of the real distance based on the measured distance. The coarse phase shift may represent an approximate distance of a scene, and the fine phase shift may represent a probability distribution of the real distance based on the approximate distance.

In some embodiments, the circuitry is configured to generate a first coded modulation signal and a second coded modulation signal, wherein the second coded modulation signal has fully reversed phase to the first coded modulation signal.

In some embodiments, the circuitry is configured to provide a spatial arrangement of demodulation frequencies.

In some embodiments, the coded modulation signal is used to modulate illumination light transmitted by the time of flight camera.

In some embodiments, the coded modulation signal is used to demodulate reflected light received by a phase pixel of a time of flight camera.

A system comprising circuitry configured to generate a coded modulation signal for modulating illumination light transmitted by a time of flight camera and/or for demodulating reflected light received by a time of flight camera, an image sensor configured to receive the reflected light, and an illumination light source configured to transmit the modulated illumination light.

In some embodiments, the image sensor is configured to demodulate the reflected signal according to spatial arrangement.

In some embodiments, the image sensor comprises multiple types of pixel sub-arrays, each sub-array being configured to demodulate the reflected light with an individual demodulation frequency.

In some embodiments, the image sensor comprises two types of pixel sub-arrays, wherein the first type of pixel sub-arrays demodulate the reflected illumination light with a high modulation frequency corresponding to a high modulation frequency of the coded modulation signal and the second type of pixel sub-arrays demodulate the reflected illumination light with a low modulation frequency corresponding to a low frequency of the coded modulation signal.

The embodiments also disclose a method comprising generating a coded modulation signal for modulating illumination light transmitted by a time of flight camera.

The embodiments also disclose a computer program comprising instructions, the instructions when executed on a processor, generating a control signal for generating a coded modulation signal for modulating illumination light transmitted by a time of flight camera.

Figure 1:
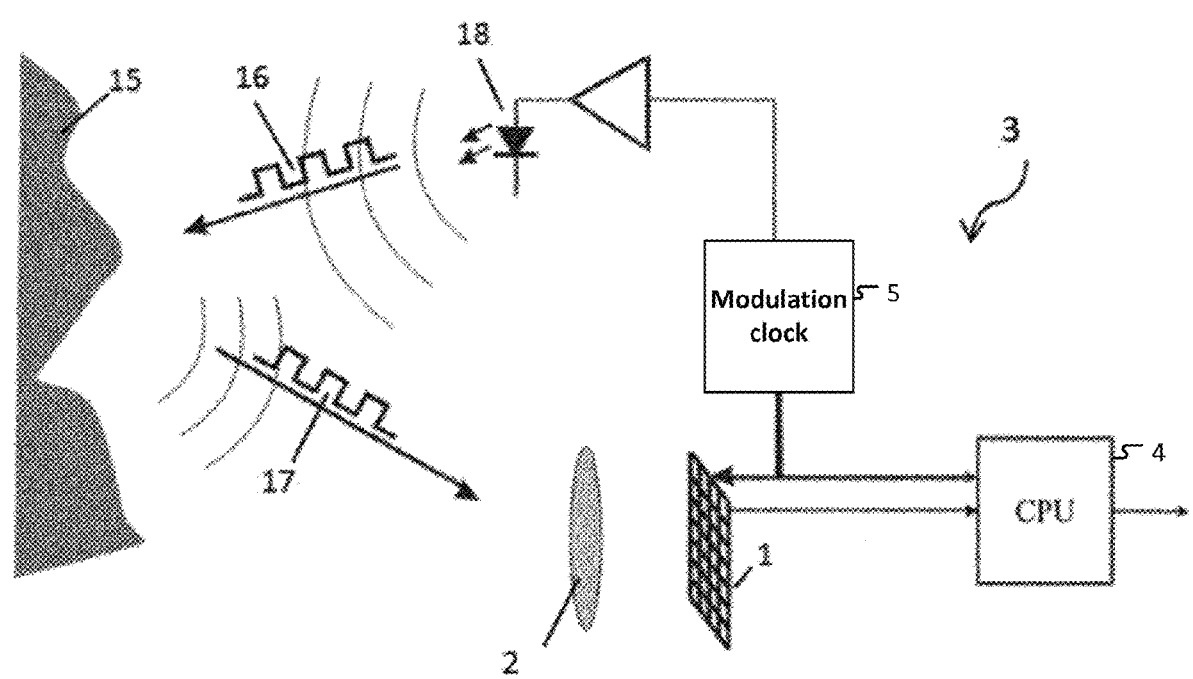
FIG. 1 schematically illustrates the basic operational principle of a ToF camera.

FIG. 1 schematically illustrates the basic operational principle of a ToF camera. The ToF camera 3 captures 3D images of a scene 15 by analyzing the Time-of-Flight of light from a dedicated illumination unit 18 to an object. The ToF camera 3 includes a camera, for instance a 3D sensor 1 and a processor 4. A scene 15 is actively illuminated with a modulated light 16 at a predetermined wavelength using the dedicated illumination unit 18, for instance with some light pulses of at least one predetermined frequency generated by a modulation clock 5 which acts as a timing generator. The modulated light 16 is reflected back from objects within the scene 15. A lens 2 collects the reflected light 17 and forms an image of the objects onto the imaging sensor 1 of the camera. Depending on the distance of objects from the camera, a delay is experienced between the emission of the modulated light 16, e.g. the so-called light pulses, and the reception at the camera of those reflected light pulses 17. Distances between reflecting objects and the camera may be determined as function of the time delay observed and the speed of light constant value.

Figure 2A:
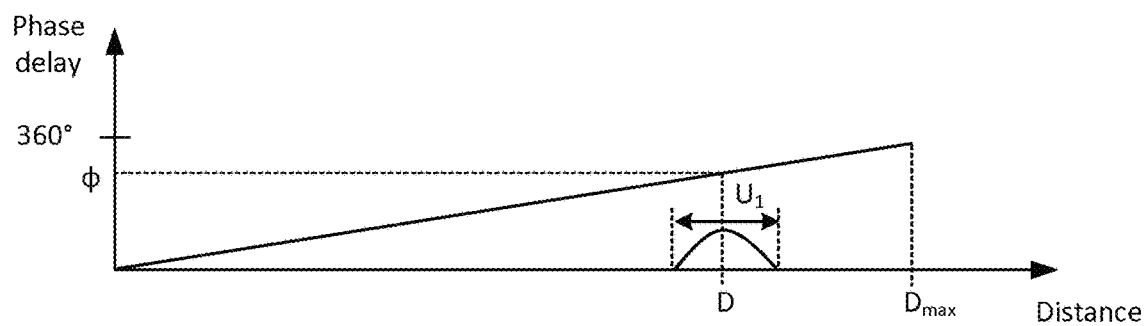
FIG. 2A shows the linear relationship between the phase delay and the distance in a ToF distance measurement.

FIG. 2A shows the linear relationship between the phase delay and the distance in a ToF distance measurement. In the diagram of FIG. 2A, on the abscissa the phase delay and on the ordinate the distance is shown. A phase delay $\varphi$ is obtained by cross correlating a backscatter light of a scene with a modulation signal. Based on the linear relationship between the phase delay and the distance, a distance D can be attributed to the phase delay $\varphi$. The distance measurement involves a distance uncertainty $U_1$ which is indicated in FIG. 2A as a normal distribution centred on the obtained distance D. The maximum measurable distance $D_{max}$ of a time of flight measurement depends on the frequency of the modulation signal. The maximum measurable distance $D_{max}$ is given as:

$$\text{Distance}_{max} = \frac{c}{2 f mod},$$

where f mod represents the modulation frequency and c is the speed of light

Figure 2B:
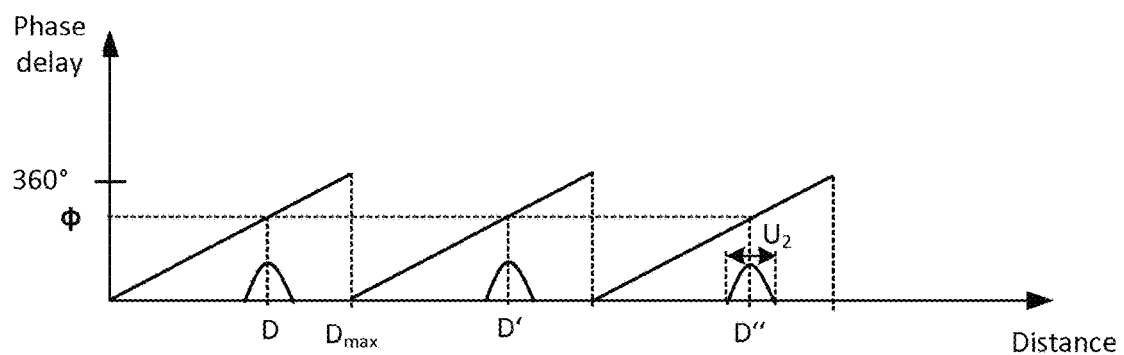
FIG. 2B describes the measurement ambiguity that arises when the distance to be measured exceeds the maximum measurable distance.

FIG. 2B describes the measurement ambiguity that arises when the distance to be measured exceeds the maximum measurable distance $D_{max}$. As shown in FIG. 2B, multiple distances D, D', D" are related to the same phase delay $\varphi$, therefore, an ambiguity for the distance measurement occurs. That is, when a distance is measured that exceeds the maximum measurable distance $D_{max}$, then the distance calculation may be wrong, because it is not able to differentiate between a signal reflected at a distance that exceeds the maximum measurable distance and another signal reflected from a closer distance with a same phase shift.

The frequency of the modulation signal used in the measurement of FIG. 2B is larger than the frequency of the modulation signal used in the measurement of FIG. 2A. On one hand, as a consequence of the larger frequency of the modulation signal, the maximum measurable distance $D_{max}$ of the measurement of FIG. 2A is larger than the maximum measurable distance $D_{max}$ of the measurement of FIG. 2B. On the other hand, the distance uncertainty $U_2$ of the measurement of FIG. 2B is smaller than the distance uncertainty $U_1$ of the measurement of FIG. 2A. That is, a modulation signal with a lower frequency (as shown in FIG. 2A) allows an extended operating range without ambiguity in the measured distance, but the distance uncertainty increases.

To extend the operation range, two distance measurements with different modulation frequency generated by two phase locked loops (PLLs) may be combined to a joint distance measurement. A first modulation signal with low frequency, large maximum measurable distance and large distance uncertainty may be used in a first distance measurement. A second modulation signal with larger frequency, smaller maximum measurable distance and smaller distance uncertainty may be used in a second distance measurement. That is, a distance measurement with multiple modulation signals with different frequency may be used, so that each modulation signal has a different ambiguity and distance uncertainty.

Coded Illumination Light

FIG. 3 shows an embodiment of a coded illumination light and its return light which aims at dealing with the ambiguity problem in ToF sensor described in FIG. 2B above. Instead of using two PLLs to generate two frequencies, as in a dual-frequency method described above with regard to FIGS. 2A and B, the embodiments of the present application create a first and a second frequency by modulating the modulated light twice to generate double-modulated illumination light. Instead of a continuous normal illumination light as shown in the upper part of FIG. 3, illumination light coded by on-off keying is transmitted as shown in the middle part of FIG. 3 (the coded illumination light is generated by "turning on and off" the normal illumination light having a high frequency).

FIG. 3 shows one packet of a coded illumination light. This packet is periodically repeated, as indicated by the dots in FIG. 3. A packet comprises four frames T0, T1, T2, T3, where each of the frames has a frame time of T. The first frame T1 starts at N×T and ends at (N+1)×T, the second frame T2 starts at (N+1)×T and ends at (N+2)×T, the third frame T3 starts at (N+2)×T and ends at (N+3)×T and the fourth frame T4 starts at (N+3)×T and ends at (N+4)×T, where N represents the packet number. In the first frame T0, the normal illumination light is off and thus no signal is generated. In the second frame T1, the normal illumination light is off for half of the sub-frame time T/2 and on for the remaining sub-frame time T/2. The third frame T2 has reversed phase compared to the second frame T1, that is the normal illumination light is on for a half sub-frame time T/2 and off for the remaining sub-frame time T/2. The fourth frame T3 has reversed phase compared to frame T0, i.e. the normal illumination light is on. The envelope of the coded illumination light thus has phase data of 0°, 90°, 270° and, respectively, 180° in one packet.

The double-modulated illumination light comprises both, high and low frequencies: the high frequency, which corresponds to the first modulation frequency, and the low frequency which corresponds to the second modulation frequency defined by the envelope. The first modulation frequency may be a "normal" modulation frequency produced by a modulation clock (see 5 in FIG. 4 below) which is typically used in a sensor of a time of flight camera. The envelope of the coded illumination light represents a low frequency (here also called "code") with a frequency of 1/T less than the first modulation frequency of the normal illumination light.

FIG. 3 further shows an example of return light produced by the coded illumination light. The return light has a phase delay compared to the coded illumination light that depends on the distance of the object at which the return light is reflected.

Figure 4:
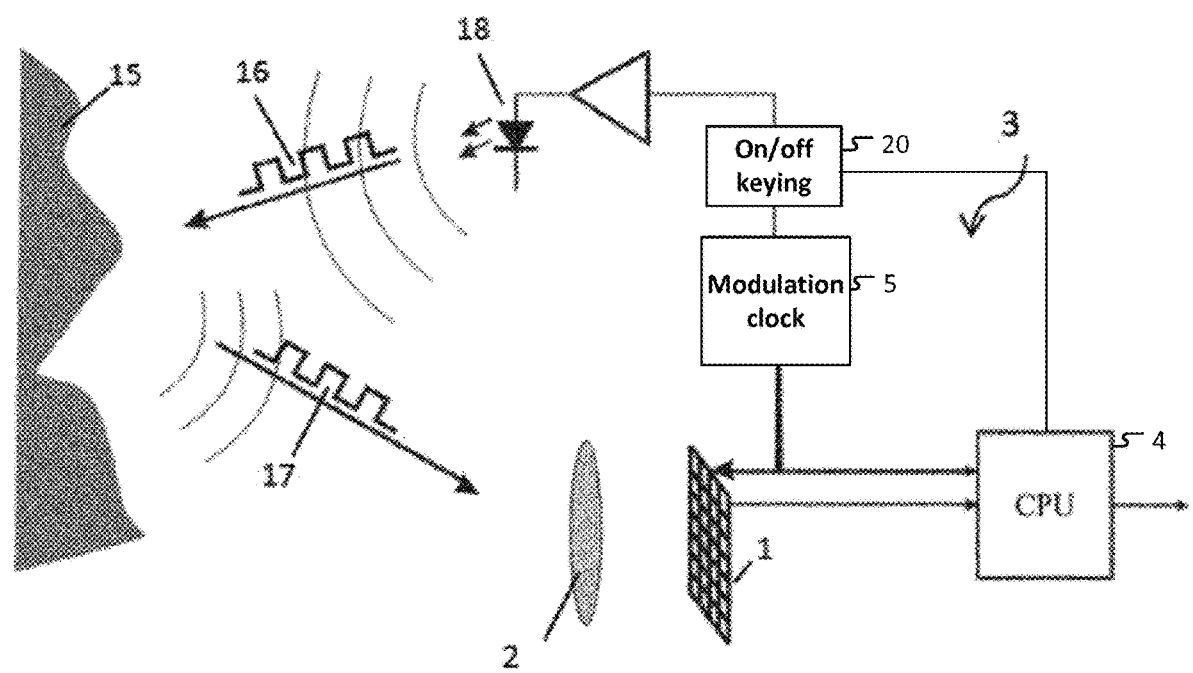
FIG. 4 schematically illustrates the basic operational principle of a ToF camera with a coded illumination light.

FIG. 4 schematically illustrates the basic operational principle of a ToF camera with a coded illumination light. FIG. 4 is based on FIG. 1 and the structural elements that have substantially the same function and structure are denoted with the same reference numerals, and repeated explanation of these structural elements is omitted. A modulation clock 5 generates a high frequency modulation signal. This modulation signal is transmitted to an on/off keying 20. The on/off keying 20 performs a second modulation of the high frequency modulation signal received from the modulation clock 5. The on/off keying 20 is controlled by a control signal received from processor 4. By on/off keying 20 a coded modulation signal is generated which is based on the high frequency modulation signal obtained from the modulation clock 5 and which is based on the control signal ("code") obtained from the processor 4. The coded modulation signal is transmitted to an illumination unit 18, which generate a coded illumination light 16. The coded illumination 16 is reflected back from object within a scene 15. The reflected light 17 is collected by a 3D sensor 1, which is demodulated with the modulation signal of the modulation clock 5.

Figure 5:
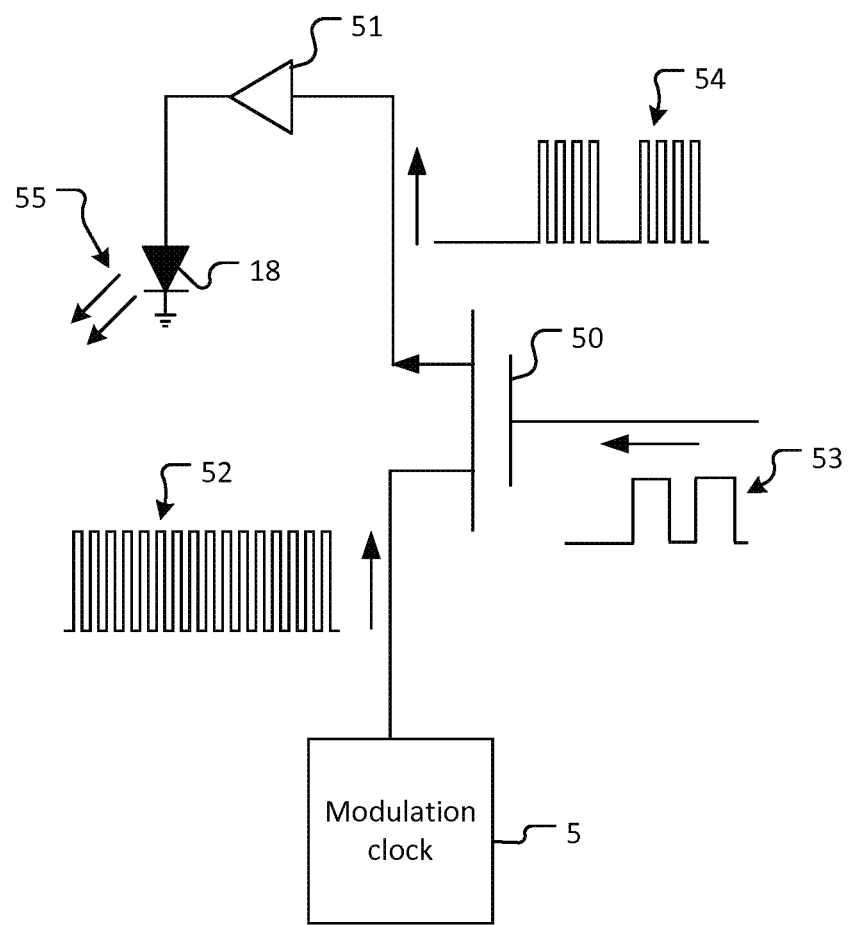
FIG. 5 shows as an example of a circuit used for implementing the on/off keying.

FIG. 5 shows as an example of a circuit used for implementing the on/off keying (20 in FIG. 4). The circuit comprises a MOSFET 50 which is used to switch the illumination unit 18 on/off. The MOSFET 50 receives a control signal 53 which is generated by a processor 4. When the MOSFET 50 receives a positive voltage, the MOSFET 50 is switched on and a high frequency modulation signal 52 generated by a modulation clock 5 is transmitted to the illumination unit 18 via a buffer 51. When the MOSFET 50 receives a zero level voltage, the MOSFET 50 is switched off so that the illumination unit 18 is switched off. As a result, a coded illumination light 55 is generated based on a coded modulation signal 54, which is generated by switching the MOSFET 50 on and off.

The frequency of the control signal 53 represents a low frequency (the envelope frequency of the coded illumination light 55) and the frequency of the modulation signal represents a high frequency, which is generated by the timing generator 5. The coded illumination light 55 is thus a double-modulated illumination light.

Demodulation in 2-Tap Single-Phase Pixel

Figure 6:
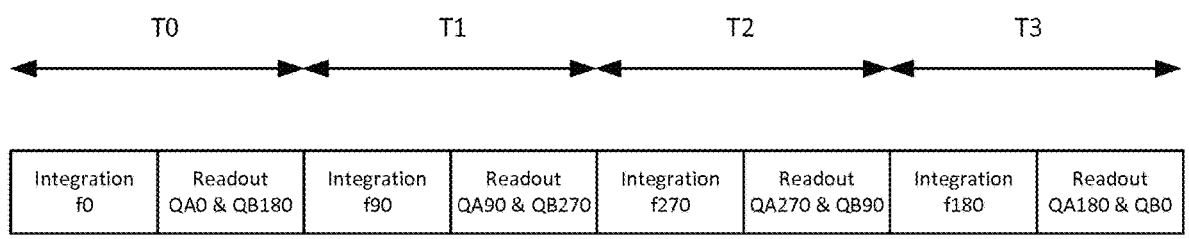
FIG. 6 shows, as an embodiment, an operation sequence in 2-tap single phase-pixel of obtaining a distance of a scene.

FIG. 6 shows, as an embodiment, an operation sequence in 2-tap single phase-pixel of obtaining a distance of a scene. In a 2-tap single-phase pixel, since only a pair of storage nodes (two floating diffusion) exists, four frames, i.e. phase $QA_0$ and $QB_{180}$, phase $QA_{90}$ and $QB_{270}$, phase $QA_{270}$ and $QB_{90}$, and phase $QA_{180}$ and $QB_0$ are needed to obtain the phase data of the return light. Each frame comprises multiple sub-frames T0, T1, T2, T3 that each include an integration phase and a readout phase.

In the integration phase of the first frame T0, the 2-tap pixel is demodulated by the modulation clock (5 in FIG. 4), which is equal to the high modulation frequency of FIG. 3, without phase delay ("f0" in FIG. 6). After the integration phase, the phase data of the 2-tap pixel is read out so that the phase data $QA_0$ of the first tap (tap A) and the phase data $QB_{180}$ of the second tap (tap B) are obtained. In the integration phase of the second frame T1, the 2-tap pixel is demodulated by the modulation clock with 90° phase delay ("f90" in FIG. 6). After the integration phase, the phase data of the 2-tap pixel is read out and the phase data $QA_{90}$ of the first tap (tap A) and the phase data $QB_{270}$ of the second tap (tap B) are obtained. In the integration phase of the third frame T2, the 2-tap pixel is demodulated by the modulation clock with 270° phase delay ("f270" in FIG. 6). After the integration phase, the phase data of the 2-tap pixel is read out and the phase data $QA_{270}$ of the first tap (tap A) and the phase data $QB_{90}$ of the second tap (tap B) are obtained. In the integration phase of the fourth frame T3, the 2-tap pixel is demodulated by the modulation clock with 180° phase delay ("f180" in FIG. 6). After the integration phase, the phase data of the 2-tap pixel is read out and the phase data $QA_{180}$ of the first tap (tap A) and the phase data $QB_0$ of the second tap (tap B) are obtained.

A fine phase delay that is based on the first (high) modulation frequency is calculated as:

$$\text{Phase Delay}_{fine} = a\tan\frac{Q_0 - Q_{180}}{Q_{90} - Q_{270}} = a\tan\frac{(Q_{A0} - Q_{B180}) - (Q_{A180} - Q_{B0})}{(Q_{A90} - Q_{B270}) - (Q_{A270} - Q_{B90})}.$$

A coarse phase delay that is based on the envelope frequency of the coded modulation signal is calculated as:

$$\text{Phase Delay}_{coarse} = a\tan\frac{(Q_{A0} + Q_{B180}) - (Q_{A180} + Q_{B0})}{(Q_{A90} + Q_{B270}) - (Q_{A270} + Q_{B90})}.$$

By using coded illumination light comprising two modulation frequencies, the coarse phase delay and the fine phase delay can be determined from the same measurement (data set) so that no additional integration and demodulation using the second frequency is needed.

Figure 7:
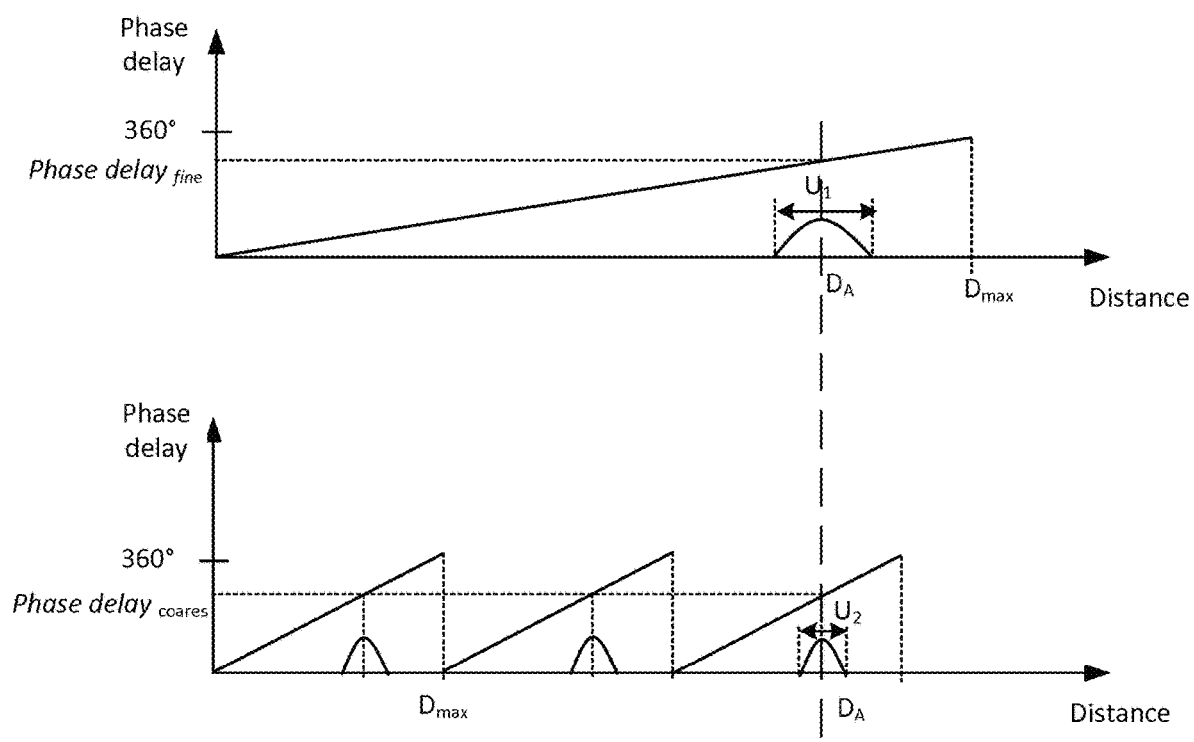
FIG. 7 describes the determination of a distance based on the obtained fine phase delay and coarse phase delay.

FIG. 7 describes the determination of a distance based on the obtained fine phase delay and coarse phase delay. The upper part of FIG. 7 represents linear relationship between the coarse phase delay and the distance in a ToF distance measurement. The lower part of FIG. 7 represents the linear relationship between the fine phase delay and the distance in a ToF distance measurement. As described with regard to FIG. 2B above, the ToF distance measurement that is based on the high frequency has a small maximal distance $D_{max}$ but a lower distance uncertainty $U_2$. To obtain the distance of an object in a scene, the information that is obtained by the two different modulation frequencies is combined. When the distance results agree between the two modulation frequencies, this distance $D_A$ is considered to be the distance of the object without distance ambiguity. The distance uncertainty of the resulting distance $D_A$ corresponds to the low distance uncertainty $U_2$ of the high frequency measurement.

Demodulation in N-Phase Pixel

Figure 8:
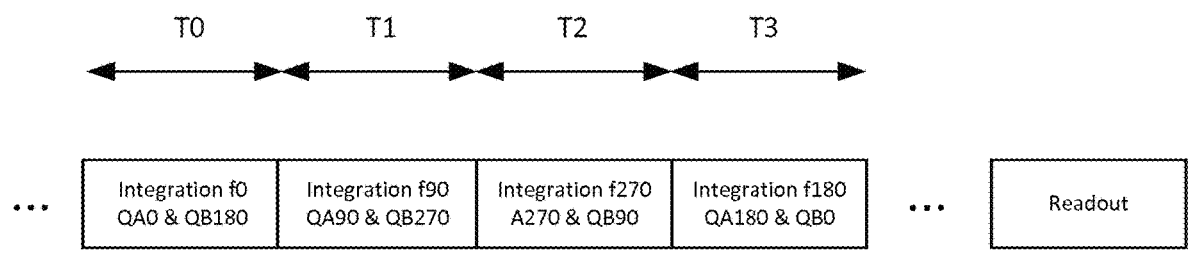
FIG. 8 shows, as an embodiment, an operation sequence in N-phase pixel, where N stands for the number of phases ("or correlations") that can be stored in the pixel.

FIG. 8 shows, as an embodiment, an operation sequence in N-phase pixel, where N stands for the number of phases ("or correlations") that can be stored in the pixel. The N-phase pixel of this embodiment includes eight floating diffusions (not shown in FIG. 8) to store eight information voltages (phase data). Therefore, the taps do not have to be read out immediately after each integration. Instead, a frame comprises multiple integration phases (sub-frames) and the taps are read out after the demodulation of several sub-frames.

In the first sub-frame T1, the N-phase pixel is demodulated by the modulation clock, which is equal to the high modulation frequency, with no phase delay ("f0" in FIG. 8). In the second sub-frame T2, the N-tap pixel is demodulated by the modulation clock with 90° phase delay ("f90" in FIG. 8). In the third sub-frame T3, the N-tap pixel is demodulated by the modulation clock with 270° phase delay ("f270" in FIG. 8). In the fourth sub-frame T3, the N-tap pixel is demodulated by the modulation clock with 180° phase delay ("f180" in FIG. 8).

After the integration phases of the sub-frames are completed, the phase data of the N-phase pixel is read out and the phase data $QA_0$, $QA_{90}$, $QA_{180}$, $QA_{270}$, and $QB_0$, $QB_{90}$, $QB_{180}$, $QB_{270}$ are obtained.

The fine phase delay that is based on the high modulation frequency is calculated as:

$$\text{Phase Delay}_{fine} = a\tan\frac{Q_0 - Q_{180}}{Q_{90} - Q_{270}} = a\tan\frac{(Q_{A0} - Q_{B180}) - (Q_{A180} - Q_{B0})}{(Q_{A90} - Q_{B270}) - (Q_{A270} - Q_{B90})}.$$

Where a tan represents the arctangent function.

The coarse phase delay that is based on the envelope frequency of the coded modulation signal is calculated as:

$$\text{Phase Delay}_{coarse} = a\tan\frac{(Q_{A0} + Q_{B180}) - (Q_{A180} + Q_{B0})}{(Q_{A90} + Q_{B270}) - (Q_{A270} + Q_{B90})}.$$

Improved SNR Performance

Figure 9:
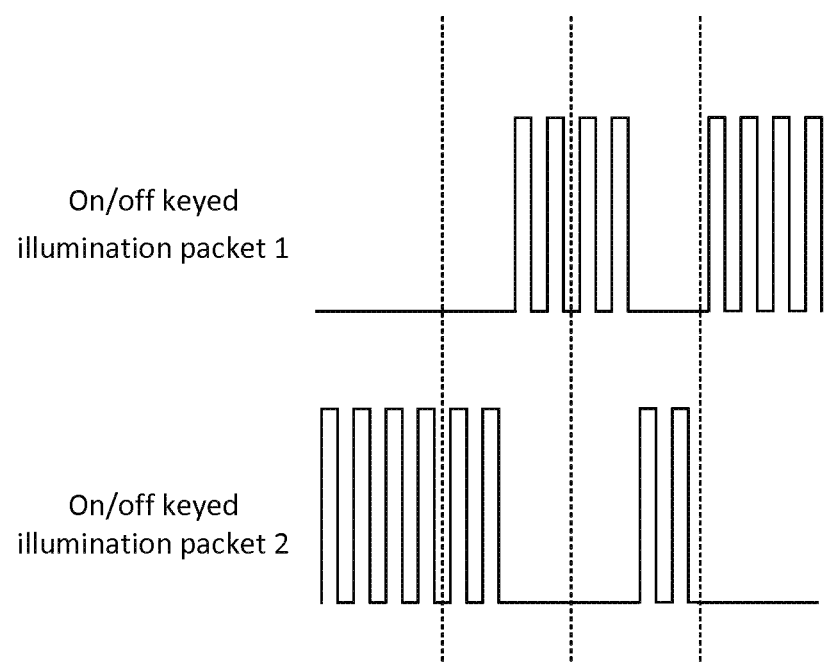
FIG. 9 shows, as another embodiment, an on/off keyed illumination packet 1 and an on/off keyed illumination packet 2.

FIG. 9 shows, as another embodiment, an on/off keyed illumination packet 1 and an on/off keyed illumination packet 2. Both of the on/off keyed illumination packets 1, 2 have an identical shape as shown in FIG. 3, where the on/off keyed illumination packet 2 has a fully reversed phase compared to the on/off keyed illumination packet 1. The on/off keyed illumination packet 1 and the on/off keyed illumination packet 2 are supplied to the 2-tap single phase pixel (as shown in FIG. 6) and/or to the N-phase pixel (as shown in FIG. 8) sequentially where the order may be organized or random. The total number of the on/off keyed illumination packets 2 is 1/N time less than the number of is the on/off keyed illumination packets 1. Therefore, the SNR performance may be improved compared to embodiment described in FIG. 3 by emitting light also in the time intervals where no light is emitted in the embodiment described in FIG. 3.

By demodulating the supplied coded modulation signals in the integration time, the phase data is integrated in each of the respective taps, and it is readout in the readout phase.

According to this example, the fine phase delay that is based on the high modulation frequency is calculated as:

$$\text{Phase Delay}_{fine} = a\tan\frac{Q0 - Q180}{Q90 - Q270} = $$

$$a\tan\frac{((Q_{A0,1} + N*Q_{A0,2}) - (Q_{B180,1} + N*Q_{B180,2})) - ((Q_{A180,1} + N*Q_{A180,2}) - (Q_{B0,1} + N*Q_{B0,2}))}{((Q_{A90,1} + N*Q_{A90,2}) - (Q_{B270,1} + N*Q_{B270,1})) - ((Q_{A270,1} + N*Q_{A270,2}) - (Q_{B90,1} + N*Q_{B90,2}))}.$$

The coarse phase delay that is based on the envelope frequency of the coded modulation signal is calculated as:

$$\text{Phase Delay}_{coarse} = a\tan\frac{((Q_{A0,1} + Q_{A0,2}) + (Q_{B180,1} + Q_{B180,2})) - ((Q_{A180,1} + Q_{A180,2}) + (Q_{B0,1} + Q_{B0,2}))}{((Q_{A90,1} + Q_{A90,2}) + (Q_{B270,1} + Q_{B270,2})) - ((Q_{A270,1} + Q_{A270,2}) + (Q_{B90,1} + Q_{B90,2}))}.$$

Where $Q_{X,1}$ represents the phase data that is obtained based on the on/off keyed illumination packet 1 and $Q_{X,2}$ represents the phase data that is obtained based on the on/off keyed illumination packet 2.

Spatial Arrangement

Figure 10A:
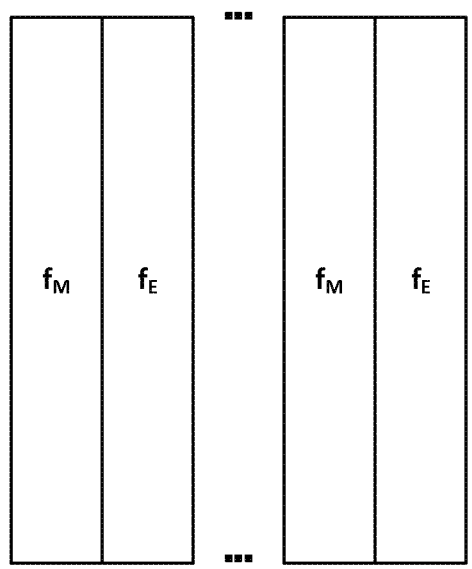
FIG. 10A shows, as an embodiment, a spatial arrangement of demodulation frequencies.

FIG. 10a shows, as an embodiment, a spatial arrangement of a sensor pixel array. The sensor pixel array receives coded illumination light as described above with regard to FIG. 3. The sensor pixel array comprises two different types of pixel sub-arrays $f_M$, $f_E$, where the first type of pixel sub-arrays $f_m$ demodulates the reflected illumination light with a high modulation frequency corresponding to the high modulation frequency of the coded modulation signal and the second type of pixel sub-arrays $f_E$ demodulates the reflected illumination light with a low modulation frequency corresponding to the low frequency (envelope) of the coded modulation signal.

According to one example of spatial arrangement, the high modulation frequency $f_M$ and the low modulation frequency $f_E$ are supplied to the columns $C_1$, $C_2$, ..., $C_{N-1}$, $C_N$ of the pixel array of the illumination unit of a time of flight camera (ToF), where the high modulation frequency $f_M$ is applied to the odd columns and the low modulation frequency $f_E$ is applied to the even columns.

By spatial arrangement of the modulation frequencies $f_M$, $f_E$, the relationship of the integration time and the time interval of the on/off keying is broken. $f_E$ may be an arbitrary frequency as long as it is smaller or equal to $f_M/2$. The columns that are marked with the high modulation frequency $f_M$ are de-modulated with high modulation frequency $f_M$ with four phase delays 0°, 90°, 180° and 270°, and the columns that are marked with the low modulation frequency $f_E$ are de-modulated with low modulation frequency $f_1$ with four phase delays 0°, 90°, 180° and 270°.

Figure 10B:
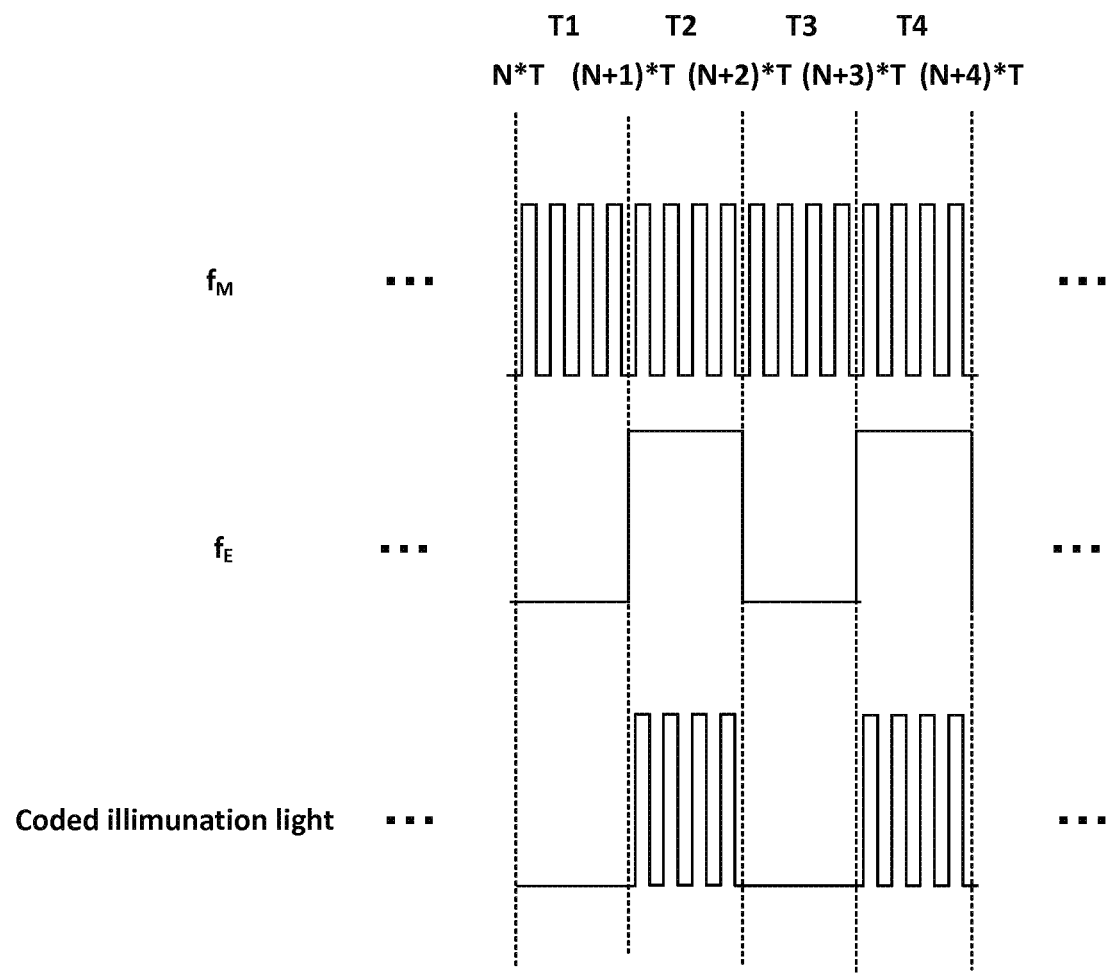
FIG. 10B shows, as an example, an illumination light with high modulation frequency, an illumination light with low modulation frequency and a resulting coded illumination light.

FIG. 10B shows, as an example, an illumination light with high modulation frequency $f_M$, an illumination light with low modulation frequency $f_E$ and a resulting coded illumination light.

The pixels may be demodulated in an integration phase and read out in a readout phase as mentioned above in the description of FIG. 6 or FIG. 8.

Based on the obtained phase data, the fine phase delay is calculated as:

$$\text{Phase Delay}_{fine} = a\tan\frac{Q_0 - Q_{180}}{Q_{90} - Q_{270}} = a\tan\frac{(Q_{A0} - Q_{B180}) - (Q_{A180} - Q_{B0})}{(Q_{A90} - Q_{B270}) - (Q_{A270} - Q_{B90})}.$$

Where, $QA_0$, $QA_{90}$, $QA_{180}$, $QA_{270}$ and $QB_0$, $QB_{90}$, $QB_{180}$, $QB_{270}$ are the demodulated data with the low modulation frequency $f_E$ in columns marked with $f_E$.

The coarse phase delay is calculated as:

$$\text{Phase Delay}_{coarse} = a\tan\frac{(Q_{A0'} - Q_{B180'}) - (Q_{A180'} - Q_{B0'})}{(Q_{A90'} - Q_{B270'}) - (Q_{A270'} - Q_{A90'})}.$$

Where, $Q_{A0}'$, $Q_{A90}'$, $Q_{A180}'$, $Q_{A270}'$ and $Q_{B90}'$, $Q_{B90}'$, $Q_{B180}'$, $Q_{B270}'$ are the demodulated data with the high modulation frequency $f_M$ in columns marked with $f_M$. Here it is to noted that the phase data $Q_{A0}'$, $Q_{A90}'$, $Q_{A180}'$, $Q_{A270}$ is subtracted with the respective phase data $Q_{B90}'$, $Q_{B90}'$, $Q_{B180}'$, $Q_{B270}'$.

The embodiment is not restricted to the spatial arrangement of the supply to the pixel columns, other spatial arrangements may be used, such as the high modulation frequency $f_M$ may be applied to the even columns and the low modulation frequency $f_E$ may be applied to the odd columns.

Further, the high modulation frequency $f_M$ and the low modulation frequency $f_E$ may be supplied to the columns of the pixel array of a pixel phase unit of a time of flight camera (ToF), where the pixel phase unit may be the unit where the backscattered light is collected.

Alternative Codes

Figure 11:
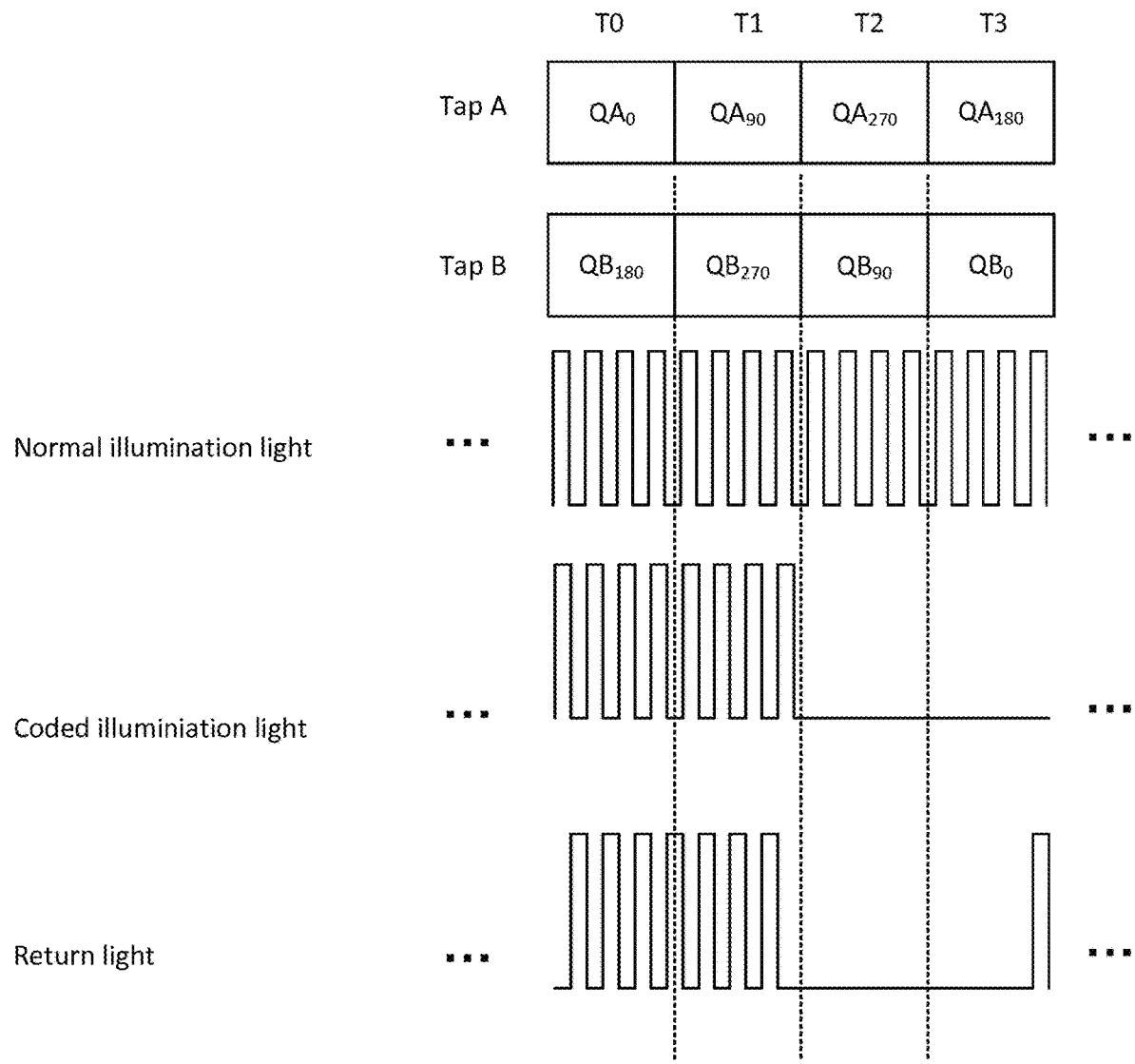
FIG. 11 shows a further embodiment of a packet of a coded illumination light and its return light.

FIG. 11 shows a further embodiment of a packet of a coded illumination light and its return light. This packet is periodically repeated, as indicated by the dots in FIG. 11. As in the embodiment of FIG. 3 described above, the packet comprises four frames T0, T1, T2, T3. FIG. 11 also illustrates the corresponding content of two taps, Tap A and Tap B, of a 2-tap phase pixel.

An on-off keying coded illumination light is transmitted as shown in the middle part of FIG. 11 (the coded illumination light is generated by "turning on and off" the normal illumination light having a high frequency). FIG. 11 further shows in the lower part a return light produced by the coded illumination light. The return light has a phase delay compared to the coded illumination light that depends on the distance of the object at which the return light is reflected.

In the first frame T0, the normal illumination light is turned on and thus the coded illumination light has the same shape as the normal illumination light. The cross correlation result of coded illumination light without phase shift and the return light is stored in Tap A. The cross correlation result of coded illumination light with 180° phase shift and the return light is stored in Tap B.

In the second frame T1, the normal illumination light is turned on and thus the coded illumination light has the same shape as the normal illumination light. The cross correlation result of coded illumination light without with 90° phase shift and the return light is stored in Tap A. The cross correlation result of coded illumination light with 270° phase shift and the return light is stored in Tap B.

In the third frame T2, the normal illumination light is turned off and thus the coded illumination light is set to zero. The cross correlation result of coded illumination light without with 270° phase shift and the return light is stored in Tap A. The cross correlation result of coded illumination light with 90° phase shift and the return light is stored in Tap B.

In the fourth frame T3, the normal illumination light is turned on and thus the coded illumination light is set to zero. The cross correlation result of coded illumination light without with 180° phase shift and the return light is stored in Tap A. The cross correlation result of coded illumination light without phase shift and the return light is stored in Tap B.

The envelope of the coded illumination light thus has phase data of 0°, 90°, 270° and, respectively, 180° in one packet.

The double-modulated illumination light comprises both, high and low frequencies: the high frequency, which corresponds to the first modulation frequency, and the low frequency which corresponds to the second modulation frequency defined by the envelope. The first modulation frequency may be a "normal" modulation frequency produced by a modulation clock (5 in FIG. 4) which is typically used in a sensor of a time of flight camera. The envelope of the coded illumination light represents a low frequency with a frequency of 1/T less than the first modulation frequency of the normal illumination light.

SNR Comparison

An SNR of a time of flight camera is estimated as $$SNR = \frac{Q_I + Q_Q}{\sqrt{\left(\sqrt{Q_I}\right)^2 + \left(\sqrt{Q_Q}\right)^2 + \left(\sqrt{Q_{ab}}\right)^2}},$$

where $Q_I$ is the light amplitude with a first frequency, $Q_I$ is the light amplitude with a second frequency and $Q_{ab}$ is the amplitude of an ambient light.

In a conventional dual frequency method that comprises two distinct measurements with two different modulation clocks $f_1$, $f_2$, the total demodulation light amplitude $Q_{sig}$ is divided for each frequency $f_1$, $f_2$. In other words, each of the modulation lights has a charge of $$\frac{Q_{sig}}{2}.$$

The total SNR of $f_1$ of the conventional dual frequency is given as:

$$SNR_{coarse} = \frac{\frac{Q_{sig}}{2}}{\sqrt{\frac{Q_{sig}}{2} + Q_{ab}}},$$

and the total SNR of $f_2$ of the conventional dual frequency is given as:

$$SNR_{fine} = \frac{\frac{Q_{sig}}{2}}{\sqrt{\frac{Q_{sig}}{2} + Q_{ab}}}.$$

According to any of the embodiments of the disclosure above and according to the description of FIGS. 3 to 11 mentioned above, the total amplitude of the coded modulation light may be equal to the amplitude of the conventional method, i.e. $Q_{sig}$. Since, according to the embodiment, the coded modulation light is turned off for half the packet duration, the amplitude of the coded modulation light can be set twice greater than the amplitude of the first or second demodulation light of the conventional demodulation light to keep the overall amplitude the same.

Therefore, the total SNR of $f_1$ according to the current disclosure is given as:

$$SNR_{coarse} = \frac{Q_{sig}}{\sqrt{Q_{sig} + Q_{ab}}},$$

and the total SNR of $f_2$ according to the current disclosure is given as:

$$SNR_{fine} = \frac{Q_{sig}}{\sqrt{Q_{sig} + Q_{ab}}}.$$

Therefore, the total SNR of the current disclosure is more advantageous than the conventional dual-frequency method because one data sampled is saved, i.e. better power efficiency.

As an example, a SNR is calculated based on FIG. 3, where the phase delay of the envelope is defined as ph (0<ph<π/4 in this code).

In the first frame T0 of FIG. 3, the SNR of the current embodiment is calculated as:

$$SNR = 2 \times \frac{ph}{\pi/2} \times SNR_{conventional}.$$

In the second frame T1 of FIG. 3, the SNR of the current embodiment is calculated as:

$$SNR = 2 \times \frac{\pi/4 - ph}{\pi/2} \times SNR_{conventional}.$$

In the third frame T2 of FIG. 3, the SNR of the current embodiment is calculated as:

$$SNR = 2 \times \frac{\pi/4 + ph}{\pi/2} \times SNR_{conventional}.$$

In the fourth frame T1 of FIG. 3, the SNR of the current embodiment is calculated as:

$$SNR = 2 \times \frac{\pi/2 - ph}{\pi/2} \times SNR_{conventional}.$$

Therefore in the first frame T0 and the second frame T1, the respective SNR of the current embodiment is always lower than conventional dual frequency method while the third frame T2 and in the fourth frame T3, the respective SNR of the current embodiment is always higher conventional dual frequency method.

In the 2-tap single-phase pixel the SNR in frame T0 and T1 may be high enough that the read out noise. One of a possible solution is to ensure that the SNR is high enough is to use two different modulation signal, where the second modulation signal is fully reversed phase to the first modulation signal as described above in FIG. 9.

Coded De-Modulation Signal

Figure 12:
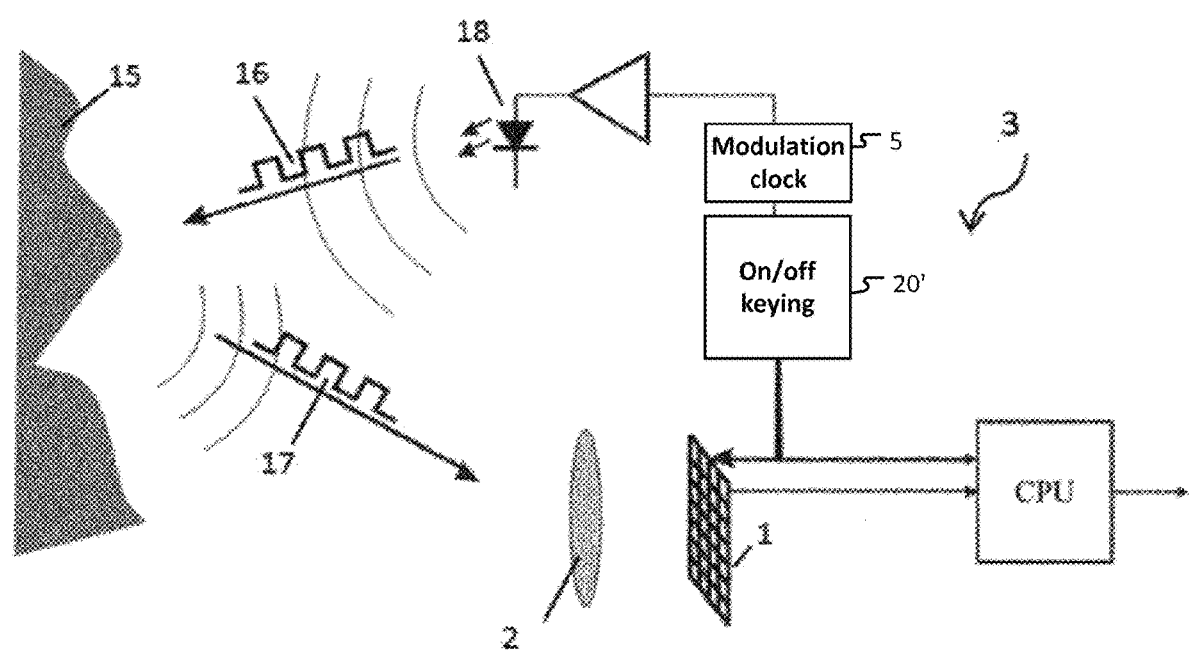
FIG. 12 schematically illustrates the basic operational principle of a ToF camera with a coded demodulation signal.

FIG. 12 schematically illustrates the basic operational principle of a ToF camera with a coded demodulation signal. FIG. 4 is based on FIG. 1 and the structural elements that have substantially the same function and structure are denoted with the same reference numerals, and repeated explanation of these structural elements is omitted. A modulation clock 5 generates a high frequency modulation signal. This modulation signal is transmitted to an on/off keying 20'. The on/off keying 20' performs a second modulation of the high frequency modulation signal received from the modulation clock 5. The on/off keying 20' is controlled by a control signal received from processor 4. By on/off keying 20' a coded de-modulation signal is generated which is based on the high frequency modulation signal obtained from the modulation clock 5 and which is based on the control signal ("code") obtained from the processor 4. The coded demodulation signal is transmitted to a 3D sensor 1, which collects a reflected light 17.

The 3D sensor 1 may be a phase pixel of a ToF camera. The phase pixels may comprise one or more floating diffusions, also called "sense node". A floating diffusion stores charge for readout, e.g. in a photogate pixel sensor. It may for example be a region in an active silicon (diffusion) region of an image sensor electrically isolated from all other nodes. It may for example be a quasi-neutral region isolated by p-n junction from other nodes. Charge collected by the two floating diffusions may for example be electrons from electron-hole pairs produced by a photo-sensing region. A photodiode may be provided to convert light into an electrical current. The photodiode empties its charge into the floating diffusion, which is protected from light. Then the floating diffusion stores the charge.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

Insofar as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to generate a coded modulation signal (54; 60) for modulating illumination light (16; 55) transmitted by a time of flight camera (3).

(2) The electronic device of (1), wherein the coded modulation signal (54; 60) is generated by on/off keying of a modulation clock (5).

(3) The electronic device of (1) or (2), wherein the coded modulation signal (54; 60) comprises at least two modulation frequencies.

(4) The electronic device of anyone of (1) to (3), wherein the coded modulation signal (54; 60) comprises a high frequency and a low frequency.

(5) The electronic device of (4), wherein the high frequency of the coded modulation signal is generated by a modulation clock (5) and the low frequency of the modulation signal corresponds to a frequency of the envelop of the coded modulation signal (54; 60).

(6) The electronic device of anyone of (1) to (5), wherein the circuitry is configured to generate double-modulated illumination light (16; 55) based on the coded modulation signal.

(7) The electronic device of anyone of (1) to (6), wherein a coded illumination light (16; 55) is generated by modulating the illumination light twice.

(8) The electronic device of anyone of (1) to (7), wherein a first frequency component of the coded modulation signal (54; 60) is used to calculate a coarse phase shift and a second frequency component of the coded modulation signal (54; 60) is used to calculate a fine phase shift.

(9) The electronic device of anyone of (1) to (8), wherein the circuitry is configured to generate a first coded modulation signal and a second coded modulation signal, wherein the second coded modulation signal has fully reversed phase to the first coded modulation signal.
(10) The electronic device of anyone of (1) to (9), wherein the coded modulation signal (54) is used to modulate illumination light transmitted by the time of flight camera.
(11) The electronic device of anyone of (1) to (9), wherein the coded modulation signal (60) is used to demodulate reflected light (17) received by a phase pixel of the time of flight camera (3).
(12) A system comprising circuitry configured to generate a coded modulation signal for modulating illumination light transmitted by a time of flight camera and/or for demodulating reflected light received by a time of flight camera, an image sensor configured to receive the reflected light, and an illumination light source configured to transmit the modulated illumination light.
(13) The system of (12), wherein the image sensor is configured to demodulate the reflected signal according to spatial arrangement.
(14) The system of (12) or (13), wherein the image sensor comprises multiple types of pixel sub-arrays ($f_M$, $f_E$), each sub-array ($f_M$, $f_E$) being configured to demodulate the reflected light with an individual demodulation frequency.
(15) The system of anyone of (12) to (14), wherein the image sensor comprises two types of pixel sub-arrays ($f_M$, $f_E$), the first type of pixel sub-arrays ($f_M$) demodulates the reflected illumination light with a high modulation frequency corresponding to a high modulation frequency of the coded modulation signal and the second type of pixel sub-arrays ($f_E$) demodulates the reflected illumination light with a low modulation frequency corresponding to a low frequency of the coded modulation signal.
(16) A method comprising generating a coded modulation signal (54; 60) for modulating illumination light transmitted (16; 55) by a time of flight camera (3).
(17) A computer program comprising instructions, the instructions when executed on a processor (4), generating a control signal (52) for generating a coded modulation signal (54; 60) for modulating illumination light transmitted (16; 55) by a time of flight camera (3).

The invention claimed is:
1. An electronic device of a sensor comprising circuitry configured to generate a coded modulation signal for modulating illumination light transmitted by a time of flight camera of the sensor, wherein
the coded modulation signal comprises a high frequency generated by a modulation clock and a low frequency corresponding to a frequency of the envelope of the coded modulation signal, and
the coded modulation signal is generated by on/off keying of the modulation clock.
2. The electronic device of claim 1, wherein the coded modulation signal comprises at least two modulation frequencies.
3. The electronic device of claim 1, wherein the circuitry is configured to generate double-modulated illumination light based on the coded modulation signal.
4. The electronic device of claim 1, wherein a coded illumination light is generated by modulating the illumination light twice.
5. The electronic device of claim 1, wherein a first frequency component of the coded modulation signal is used to calculate a coarse phase shift and a second frequency component of the coded modulation signal is used to calculate a fine phase shift.
6. The electronic device of claim 1, wherein the circuitry is configured to generate a first coded modulation signal and a second coded modulation signal, wherein the second coded modulation signal has fully reversed phase to the first coded modulation signal.
7. The electronic device of claim 1, wherein the coded modulation signal is used to modulate illumination light transmitted by the time of flight camera.
8. The electronic device of claim 1, wherein the coded modulation signal is used to demodulate reflected light received by a phase pixel of the time of flight camera.
9. A system comprising:
circuitry configured to generate a coded modulation signal for modulating illumination light transmitted by a time of flight camera and/or for demodulating reflected light received by the time of flight camera of the system, wherein
the coded modulation signal comprises a high frequency generated by a modulation clock and a low frequency corresponding to a frequency of the envelope of the coded modulation signal, and
the coded modulation signal is generated by on/off keying of the modulation clock;
an image sensor configured to receive the reflected light, and
an illumination light source configured to transmit the modulated illumination light.
10. The system of claim 9, wherein the image sensor is configured to demodulate the reflected signal according to spatial arrangement.
11. The system of claim 9, wherein the image sensor comprises multiple types of pixel sub-arrays, each sub-array being configured to demodulate the reflected light with an individual demodulation frequency.
12. The system of claim 9, wherein the image sensor comprises two types of pixel sub-arrays, wherein the first type of pixel sub-arrays demodulates the reflected illumination light with a high modulation frequency corresponding to a high modulation frequency of the coded modulation sig-nal and the second type of pixel sub-arrays demodulates the reflected illumination light with a low modulation frequency corresponding to a low frequency of the coded modulation signal.
13. A method comprising generating a coded modulation signal for modulating illumination light transmitted by a time of flight camera, wherein
the coded modulation signal comprises a high frequency and a low frequency and the generating the coded modulation signal includes generating the high frequency using a modulation clock and generating the low frequency corresponding to a frequency of the envelope of the coded modulation signal, and
generating the coded modulation signal is by on/off keying of the modulation clock.
14. A non-transitory computer-readable medium comprising instructions, the instructions when executed on a processor, generating a control signal for generating a coded modulation signal for modulating illumination light transmitted by a time of flight camera, wherein the coded modulation signal comprises a high frequency generated by a modulation clock and a low frequency corresponding to a frequency of the envelope of the coded modulation signal, and generating the coded modulation signal is by on/off keying of the modulation clock.

\* \* \* \* \*